Figure 1:
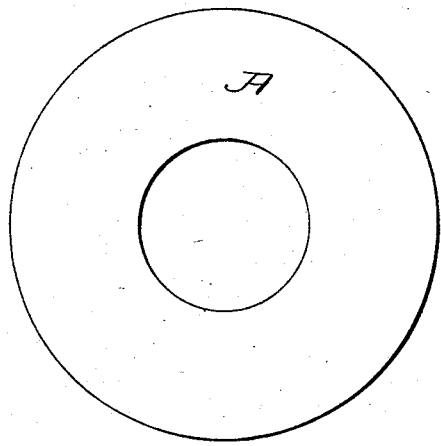

(No Model.)

A. P. COCHRANE.
SHEET PACKING.

No. 524,162. Patented Aug. 7, 1894.

Witnesses
F. P. Cornwall
Hugh K. Wagner

Inventor
Albert P. Cochrane
By Paul Bakewell
his atty.

UNITED STATES PATENT OFFICE.

ALBERT P. COCHRANE, OF ST. LOUIS, MISSOURI.

SHEET-PACKING.

SPECIFICATION forming part of Letters Patent No. 524,162, dated August 7, 1894.

Application filed September 5, 1893. Serial No. 484,835. (No model.)

*To all whom it may concern:*

Be it known that I, ALBERT P. COCHRANE, a citizen of the United States, residing in the city of St. Louis, State of Missouri, have invented a certain new and useful Improvement in Sheet-Packing, of which the following is a full, clear, and exact description, such as will enable others skilled in the art to which it appertains to make and use the same.

My invention relates to a new and useful improvement in sheet packing for steam joints, valve seats, &c., from which packing rings or other analogous articles can be cut, and consists particularly in the assemblage of two or more layers of rubber in such manner that when the same is subjected to the action of heat that one or more of the layers will become hard or vulcanized, and in that condition remain, resisting the further action of the heat and preventing the joint from becoming "blown out," while the other layer, or layers, will remain soft or pliable, they being unaffected by heat, in which condition, these latter-named layers will be in readiness at all times to absorb the expansion and contraction of the pipes or other metallic portions to which they may be attached, thus maintaining a tight joint.

Heretofore, packing has been used which would vulcanize and become very hard under the action of heat, but the objection to such packing resided in the fact that the same, in becoming hard, would be "set" to exactly fit the space in which it was confined, and when the heat was taken off, the metallic portions would contract, and, in doing so, would leave an opening for the escape of the steam or hot air when the pipes were again charged, which escape would continue until the pipes or other metallic portions assumed their expanded or abnormal condition. I am aware, also, that soft packing has been used, whose office was to absorb or take up the difference in space at the joints due to expansion and contraction of the metallic portions, but this form of packing also had its objections, which reside in certain portions thereof, being unattached or not permanently secured, blowing out under the excess pressure.

The object of this present invention is to provide a packing having present the virtues of each of these two before-mentioned forms, in which the objectionable features are absent. To accomplish this, I combine two or more layers of rubber by adhesion to form a sheet, which layers are of different compositions—that is, one being susceptible of becoming hard or vulcanized under the action of heat, and the other remaining at all times soft and pliable, to absorb the differences in space caused by expansion and contraction. By such a construction, when the packing is in place, under heat, one or more of its layers become and remain very hard, which will prevent the joint from blowing out, while the other layer, or layers, will remain in their normal soft or pliable condition, to take up the differences in space as before referred to. It will thus be seen that by so combining the layers, that I have a packing combining all the good qualities of the soft and hard rubbers, at the same time dispensing with their ever present objections when in use singly.

The layer or layers which are susceptible of vulcanization under the action of heat, are preferably made of a composition of vulcanizable gum, with which is mixed sulphur, and refractory earths, as is common.

The layer or layers which remain soft or pliable under the action of heat, are preferably made of a composition of antimony red, as it is called, and rubber.

Figure 2:
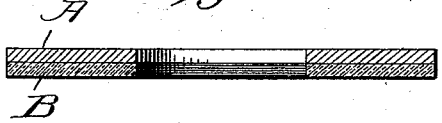
Figure 3:
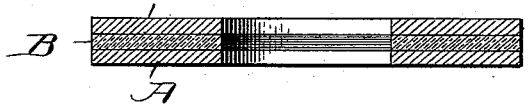
Figure 4:
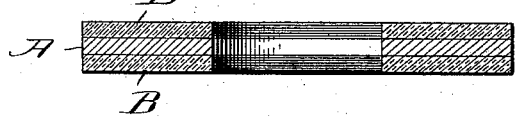

Referring to the accompanying drawings, which illustrate the several adaptations or modifications of my invention, Figure 1 illustrates a plan-view of a packing ring cut from a sheet of my improved packing. Fig. 2 illustrates a cross-sectional view, showing the layers of the different rubbers, in which A indicates the soft or pliable rubber, and B the layer which becomes hard or vulcanized under the action of heat. Fig. 3 illustrates a form in which the layer of rubber which becomes hard or vulcanized under the action of heat is faced on either side by a layer of soft or pliable rubber; and Fig. 4 illustrates two layers, B, of the rubber which become hard under the action of heat, having interposed therebetween a layer of soft or pliable rubber A.

Although I have shown the adaptation of my improved product in the form of packing rings, still it will be obvious that there are many other uses to which a sheet of rubber, composed of the different layers as hereinbefore set forth, could be advantageously employed; therefore, I do not wish to be understood as confining myself to the particular use described.

Having thus described my invention, what I claim, and desire to secure by Letters Patent of the United States, is—

1. As a new article of manufacture, a sheet packing which is composed of exposed layers of rubber of different compositions, one or more being of such nature as to become hard under the action of heat, and one or more other layers which remain soft or pliable under the same conditions which harden the first mentioned layer or layers.

2. As a new article of manufacture, a sheet packing which is composed of exposed layers of rubber of different compositions which are adhered to each other, one or more of said layers being of such nature as to become hard and remain hard or vulcanized under the action of heat, and the other layer or layers being of such nature as to remain in their normal state of softness or pliability.

3. As a new article of manufacture, a packing ring which is composed of two or more exposed layers of rubber of different compositions, one or more of said layers being of such nature as to become hard or vulcanized under the action of heat, while the other layer or layers remain soft or pliable under the same conditions.

In testimony whereof I hereunto affix my signature, in presence of two witnesses, this 30th day of August, 1893.

ALBERT P. COCHRANE.

Witnesses:
F. R. CORNWALL,
HUGH K. WAGNER.